US012591092B2

(12) United States Patent
Chiu et al.

(10) Patent No.: US 12,591,092 B2
(45) Date of Patent: Mar. 31, 2026

(54) COVERED CAVITY FOR A PHOTONIC INTEGRATED CIRCUIT (PIC)

(71) Applicant: Intel Corporation, Santa Clara, CA (US)

(72) Inventors: Chia-Pin Chiu, Tempe, AZ (US); Omkar G. Karhade, Chandler, AZ (US); Kaveh Hosseini, Livermore, CA (US); Tim T. Hoang, San Jose, CA (US); Nitin A. Deshpande, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 834 days.

(21) Appl. No.: 17/725,090

(22) Filed: Apr. 20, 2022

(65) Prior Publication Data

US 2023/0341622 A1     Oct. 26, 2023

(51) Int. Cl.
| | |
|---|---|
| *G02B 6/42* | (2006.01) |
| *G02B 6/12* | (2006.01) |
| *G02B 6/122* | (2006.01) |

(52) U.S. Cl.
CPC ......... *G02B 6/1225* (2013.01); *G02B 6/4266* (2013.01); *G02B 6/428* (2013.01); *G02B 2006/12061* (2013.01)

(58) Field of Classification Search
CPC ...................................................... G02B 6/4266
See application file for complete search history.

(56) References Cited

U.S. PATENT DOCUMENTS

| | | | | |
|---|---|---|---|---|
| 2003/0219192 A1* | 11/2003 | Crafts | ..................... | G02B 6/12 |
| | | | | 385/14 |
| 2004/0190826 A1* | 9/2004 | Ghiron | ................. | G02B 6/4206 |
| | | | | 385/36 |
| 2005/0111778 A1* | 5/2005 | Takahashi | ............. | G02F 1/0147 |
| | | | | 385/39 |
| 2008/0205838 A1* | 8/2008 | Crippa | ................... | G02B 6/124 |
| | | | | 385/126 |
| 2017/0293073 A1* | 10/2017 | Chen | ...................... | G02B 6/138 |
| 2018/0212080 A1* | 7/2018 | Meyer | ................... | G02B 6/124 |
| 2021/0109382 A1* | 4/2021 | Bovington | ............. | G02B 6/138 |

* cited by examiner

*Primary Examiner* — Charlie Y Peng
(74) *Attorney, Agent, or Firm* — Alliance IP, LLC

(57)     ABSTRACT

Covered cavity structure for Photonic integrated circuits (PICs) that include a micro-ring resonator (MRR) with a heater. Air cavities are etched or otherwise thinned into an overlaying oxide layer, a buried oxide layer, or an underlying silicon layer. Variations in size, shape, and location of the covered air cavity associated with an MRR provide customizable options for thermal management. A thin film across an upper surface covers the air cavity, providing a barrier to underfill in the air cavity and preventing interference of underfill with performance of silicon waveguides. When arrayed into a plurality of MRRs, the thin film can cover the plurality of MRRs.

24 Claims, 9 Drawing Sheets

FIG. 1B VIEW AA'

FIG. 1C VIEW BB'

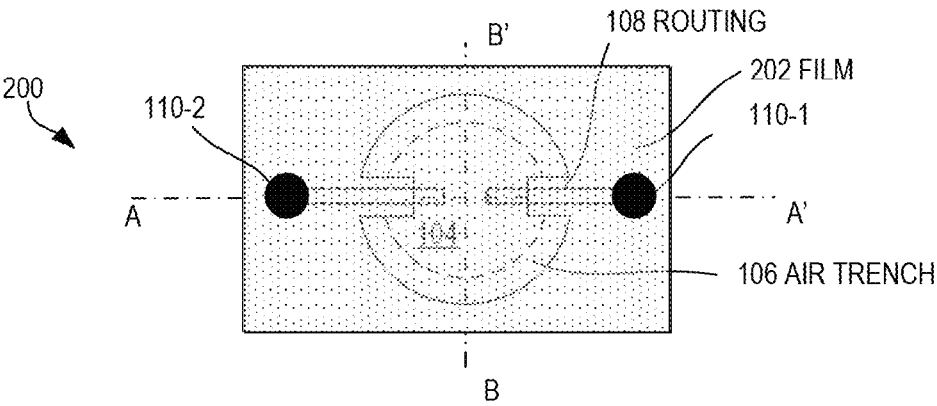
FIG. 2A TOP VIEW
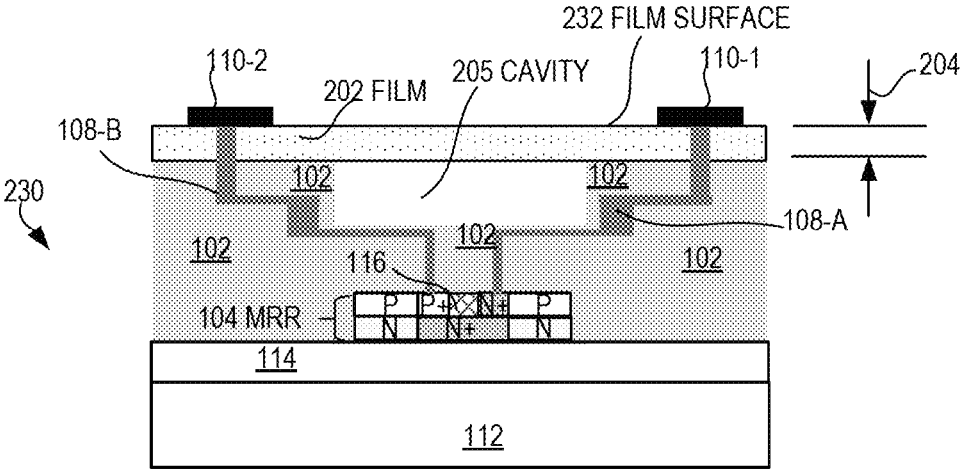
FIG. 2B VIEW AA'
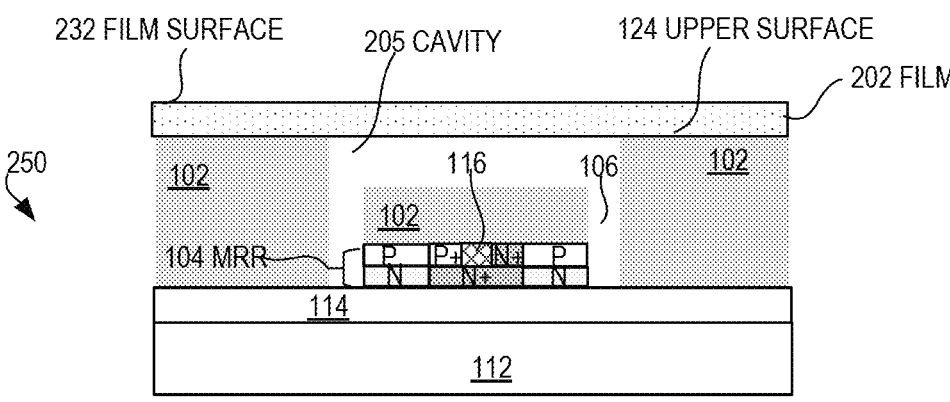
FIG. 2C VIEW BB'

500

IHS 512     TIM 514

FAU (TOP SIDE CONNECTION) 516

CPU/GPU/FPGA 506

EIC 504

MCP PACKAGE SUBSTRATE 510

EMIB 508

OCPIC 502

FAU (EDGE CONNECTION) 518

600

602

602

700

734

710

708

728

706

704

724

736    736

728b 728a          728

728b

728a

722

740          720    720

726

726

726

726

702

719

HOUSING 901

900

| PROCESSOR UNIT 902 | COMMUNICATION COMPONENT 912 |

| MEMORY 904 | BATTERY/POWER 914 |

| DISPLAY DEVICE 906 | GNSS DEVICE 918 |

| AUDIO OUTPUT DEVICE 908 | AUDIO INPUT DEVICE 924 |

| AN OTHER OUTPUT DEVICE 910 | AN OTHER INPUT DEVICE 920 |

ANTENNA 922

COVERED CAVITY FOR A PHOTONIC INTEGRATED CIRCUIT (PIC)

STATEMENT OF GOVERNMENT INTEREST

This invention was made with Government support under Agreement No. HR00111830002 awarded by the United States Department of Defense. The Government has certain rights in the invention.

BACKGROUND

Silicon photonics combines integrated circuits and semiconductor lasers and has enabled the combination of previously disparate optical components into a silicon photonic integrated circuit (PIC) with fewer silicon photonics components that are more compact and lower power. One such silicon photonics component is a micro-ring resonator (MRR). A given PIC may have multiple MRRs, depending on the application. A MRR may have integrated therewith a heater employed for wavelength resonance tuning of the MRR. Thermal management strategies are often employed because heat generated by the heater in the MRR can adversely affect system power efficiency. Improvements to the thermal management strategies for a PIC are desirable.

BRIEF DESCRIPTION OF THE DRAWINGS

FIGS. 1A-1C are illustrations providing different views of the MRR in an open cavity photonic integrated circuit (OCPIC), in accordance with various embodiments.

FIGS. 2A-2C are illustrations depicting a covered cavity for the MRR in an OCPIC, in accordance with various embodiments.

DETAILED DESCRIPTION

Figure 1A:
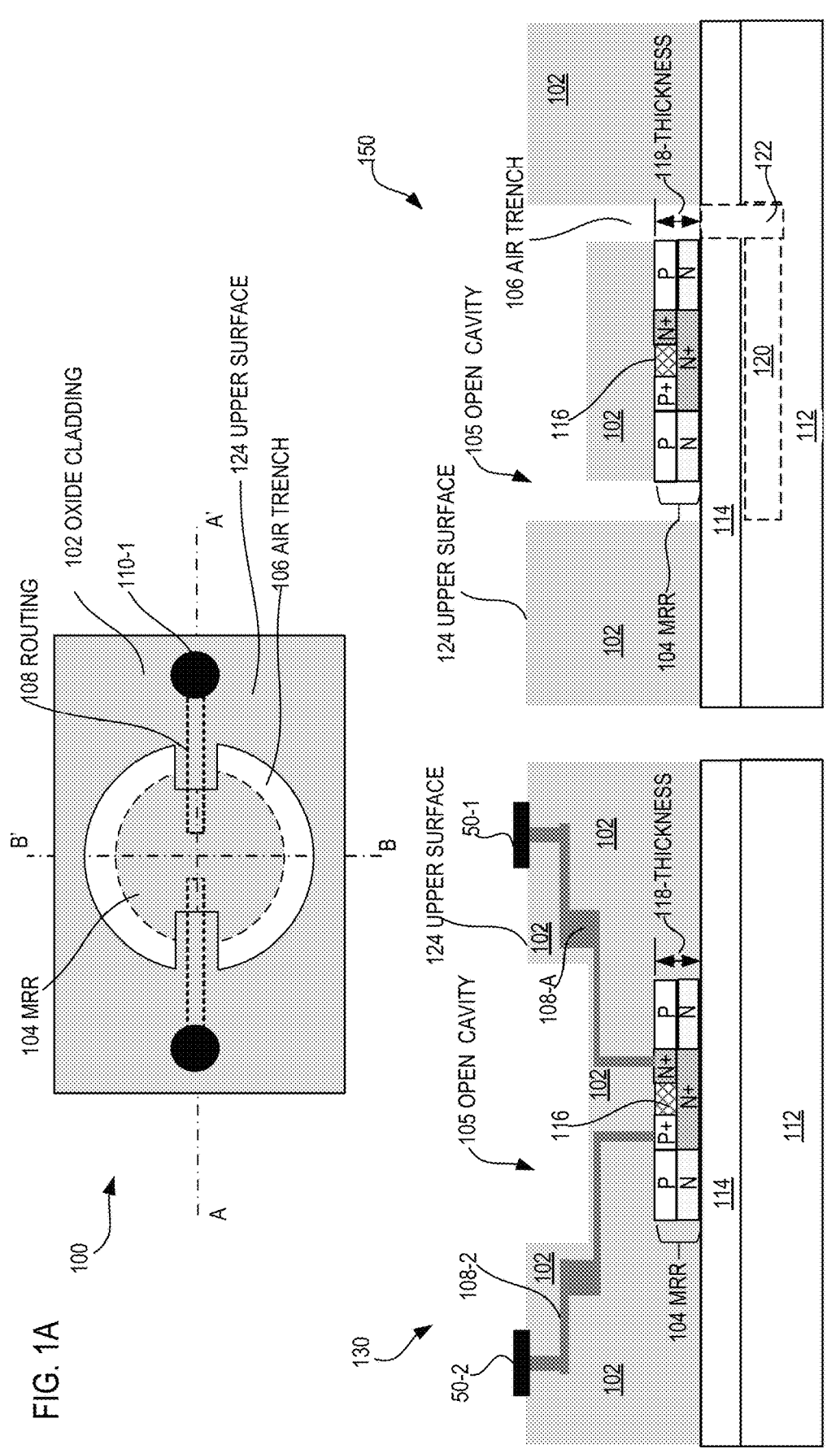

The following detailed description is merely exemplary in nature and is not intended to limit the application and uses. It may be evident that the novel embodiments can be practiced without every detail described herein. For the sake of brevity, well known structures and devices may be shown in block diagram form in order to facilitate a description thereof.

Silicon photonics is a technology that has enabled the combination of previously disparate optical components into silicon photonic integrated circuits (PICs) having fewer components that are more compact and lower power than other technologies. A non-limiting example is a component called a silicon micro-ring resonator (MRR). The MRR is a passive silicon waveguide structure generally including an optical waveguide that is looped back on itself to resonate at one or more frequencies referred to as a spectral response, or free spectral range (FSR), of the MRR. Silicon photonics has enabled the MRR to be very compact (i.e., have a small bend radius). An exemplary PIC can have thousands of MRRs.

The frequency of the MRR can be tuned via wavelength resonance tuning. To achieve wavelength resonance tuning of a MRR, various embodiments of the MRR may employ a respective heater, generally integrated therewith. Wavelength resonance tuning of the MRR in an OCPIC is particularly useful in systems that utilize wavelength division multiplexing (WDM), such as, systems that operate with an optical input/output. However, heat from the MRR can have an adverse effect, manifesting as an elevated energy-per-bit (pico-Joules per bit or pJ/bit) of a channel of a WDM system. Additionally, in various applications, heat generated by the MRR can adversely impact performance and power efficiency of an electronic integrated circuit (EIC) that is located on or next to a PIC that is on-chip, as an open-cavity PIC (OCPIC), and/or a multi-chip system that the OCPIC is utilized in.

Some solutions employ thermal insulation strategies, such as, open cavities and air trenches, located in and around the MRR, to reduce heat lost. The air cavities and trenches may be implemented from a top side or from a bottom side of an OCPIC. However, regardless of whether cavities and/or trenches were etched from a top side of an OCPIC or a bottom side of an OCPIC, available thermal management solutions for the MRR continue to present technical challenges. For example, many available solutions are not assembly-friendly, leaving open-cavities and voids that are difficult to underfill, incompatible with downstream processes, and causing reliability issues. In some applications, underfill material that is not compatible with silicon waveguides due to its light absorption (e.g., underfill with particle filler) is used. Therefore, improved thermal management strategies for an OCPIC are desirable.

The present disclosure provides a technical solution to the above-described problems and provides an improvement over the limitations of available solutions, in the form of a covered air cavity for a MRR in OCPIC (shortened herein to "covered cavity"). The covered cavity is described in more detail in connection with the figures below.

Exemplary embodiments will hereinafter be described in conjunction with the following drawing figures, wherein like numerals denote like elements. Figures are not necessarily to scale but may be relied on for spatial orientation and relative positioning of features. As may be appreciated, certain terminology, such as "ceiling" and "floor", as well as "upper,", "uppermost", "lower," "above," "below," "bottom," and "top" refer to directions based on viewing the Figures to which reference is made. Further, terms such as "front," "back," "rear,", "side", "vertical", and "horizontal" may describe the orientation and/or location of portions of the component within a consistent but arbitrary frame of reference which is made clear by reference to the text and the associated Figures describing the component under discussion. Such terminology may include the words specifically mentioned above, derivatives thereof, and words of similar import.

As used herein, the term "adjacent" refers to layers or components that are in direct physical contact with each other, with no layers or components in between them. For example, a layer X that is adjacent to a layer Y refers to a layer that is in direct physical contact with layer Y. In contrast, as used herein, the phrase(s) "located on" (in the alternative, "located under," "located above," or "located next to," in the context of a first layer or component located on a second layer or component) includes (i) configurations in which the first layer or component is directly physically attached to the second layer (i.e., adjacent), and (ii) component and configurations in which the first layer or component is attached (e.g. coupled) to the second layer or component via one or more intervening layers or components.

The term "overlaid" (past participle of "overlay") may be used to refer to a layer to describe a location and orientation for the layer but does not imply a method for achieving the location and orientation. For example, a first layer overlaid on a second layer, or overlaid on a component means that the first layer is spread across or superimposed on the second layer or component. Accordingly, a layer that is overlaid on a second layer is also adjacent to the second layer, notably in a cross-sectional view.

As used herein, the term "electronic component" can refer to an active electronic circuit (e.g., processing unit, memory, storage device, FET) or a passive electronic circuit (e.g., resistor, inductor, capacitor).

As used herein, the term "integrated circuit component" can refer to an electronic component configured on a semiconducting material to perform a function. An integrated circuit (IC) component can comprise one or more of any computing system components described or referenced herein or any other computing system component, such as a processor unit (e.g., system-on-a-chip (SoC), processor core, graphics processor unit (GPU), accelerator, chipset processor), I/O controller, memory, or network interface controller, and can comprise one or more additional active or passive devices such as capacitors, decoupling capacitors, resistors, inductors, fuses, diodes, transformers, sensors, electrostatic discharge (ESD) devices, and memory devices.

A non-limiting example of an unpackaged integrated circuit component includes a single monolithic integrated circuit die (shortened herein to "die"); the die may include solder bumps attached to contacts on the die. When present on the die, the solder bumps can enable the die to be directly attached to a printed circuit board (PCB).

A non-limiting example of a packaged integrated circuit component comprises one or more integrated circuit dies mounted on a package substrate with the integrated circuit dies and package substrate encapsulated in a casing material, such as a metal, plastic, glass, or ceramic. Often the casing includes an integrated heat spreader (IHS); the packaged integrated circuit component often has bumps or leads attached to the package substrate for attaching the packaged integrated circuit component to a printed circuit board or motherboard.

In FIG. 1A, a top view illustrating an embodiment of an open cavity photonic integrated circuit (OCPIC). Various embodiments include an oxide 102 layer over a substrate 112 or wafer, and a first region (inner region) thereof having a MRR 104 in between the oxide 102 layer and the substrate 112, and a second region (an outer region) thereof not having the MRR 104. A cross-sectional view 130 corresponding to a first cut AA' of FIG. 1A is depicted in FIG. 1B, and a cross-sectional view 150 corresponding to a second cut BB' of FIG. 1A is depicted in FIG. 1C. The first cut AA' and the second cut BB' intersect perpendicularly at a center/axis of the MRR 104. Embodiments are characterized by the geometries and spatial relationships described herein.

The oxide 102 layer is a layer comprising oxide, extends past the MRR 104, and may include silicon dioxide. The MRR 104 is a silicon waveguide structure that may comprise lightly-doped P region, lightly-doped N region, highly-doped P+ region, highly-doped N+ region, intrinsic silicon and silicon dioxide (as a divider between different Si doping regimes. A non-limiting way to identify the MRR 104 is to visually inspect both the materials present in a cross-sectional view and the structure and shape of the materials to determine that the silicon waveguide has been implemented. Although, in various embodiments, the MRR 104 may comprise the same materials as a CMOS component, the structure of the MRR 104, and its shape employ different doping profiles than a CMOS component. Embodiments of the MRR 104 may have a thickness of about 220 nanometers. In various embodiments, the MRR 104 may be located on a silicon-on-insulator (SOI) wafer, and the substrate 112 is silicon.

In some embodiments, a buried oxide layer (BOX) 114 layer may be located between the MRR 104 and the substrate 112. In various embodiments the BOX 114 layer comprises silicon dioxide and is about 2 to 3 microns thick; the substrate 112 may be in a range of about 50 to 200 microns (wherein "about" means plus or minus 2%). In some embodiments, in areas not including the MRR 104, the oxide layer and the BOX 114 may be indistinguishable from each other.

In various embodiments, the MRR 104 includes a heater 116. In a non-limiting example, the heater 116 is depicted in the center of the MRR 104. Routing 108-A represents a signal route or metal route from a N+ doped region in the MRR 104 to a bump pad 50-1, 50-2 on the upper surface 124. Additionally, routing 108-B represents a signal or metal route from a P+ doped region in the MRR 104 to a respective bump pad on the upper surface 124. In various embodiments, routing 108 can represent silicon waveguides.

In a non-limiting example, as depicted in FIGS. 1A-1C, the air cavity 105 may be a three-dimensional volume or air cavity that is open on only one side, which is an upper surface 124 (with respect to the drawings) of the oxide 102 layer. The air cavity 105 may embody thinned oxide 102 layer (e.g., as achieved by etching), to reduce heat loss from the MRR 104 to an upper surface 124. The air cavity may be located on the MRR 104. Viewing FIG. 1A with FIG. 1C, the air cavity 105 may embody the air trench 106; the air trench 106 is a gap/opening in the oxide 102 layer that encircles at least a portion of the MRR 104 and extends outward radially therefrom. Viewing FIG. 1A-FIG. 1C, the air cavity 105 may extend radially past an outer edge of the MRR 104. The cross-sectional view corresponding to the first cut AA' illustrates that oxide 102 layer is not removed in areas that are used for metal traces and routing 108.

As shown in the FIGS. 1B-1C, the air trench 106 is an opening in at least the oxide 102 layer, from the upper surface 124 of the oxide 102 layer, downward. In various embodiments, the air cavity 105 includes the air trench 106. In various embodiments, the OCPIC further comprises a buried oxide layer (BOX) 114 between the MRR 104 and the silicon substrate 112, and the air trench 106 extends into the buried oxide layer and into the substrate 112 or silicon layer under the MRR 104. This is indicated with optional geometry 122 and further includes an optional air cavity 120 that extends in the silicon layer 112 under the MRR 104. Variations in size, shape, and location of the air cavity provides customizable options for thermal management.

FIGS. 1A-1C illustrate various embodiments of an open air cavity 105, in which the air cavities are open to the upper surface 124. The opening to the upper surface 124 from these thermal management strategies can introduce technical problems for assembly and underfill, as described herein.

Accordingly, embodiments disclosed herein provide a technical solution by covering the cavity for the MRR 104. Turning to FIGS. 2A-2C, and with continued reference to FIGS. 1A-1C, a covered cavity 205 for the MRR 104 in an OCPIC is described, in accordance with various embodiments. A thin film 202 of thickness 204 is overlaid on the upper surface 124 of the OCPIC. The thin film 202 retains a planar structure at the upper surface 124, extending across an air cavity. In various embodiments, the thin film 202 is an organic film. Non-limiting examples of the film 202 include a polyimide film, a photo-resist, dielectric, and an epoxy. In various embodiments, the thickness 204 is 5-20 microns (um)[. As can be seen from the views in FIGS. 2A-2C, the film 202 serves as a lid on the upper surface 124, extending across the opening at the upper surface 124 and thereby enclosing the air cavity at the upper surface 124, creating a covered cavity 205 over and/or around the MRR 104 (i.e., film 202 has enough rigidity or high enough viscosity that it does not sag into the open cavity). Additionally, as can be seen in FIGS. 2A-2C, the routing 108-A and 108-B can extend vertically (with respect to the illustration) through the film 202 to the film surface 232 to respective metal contacts 110-1 and 110-2.

Figure 3A:
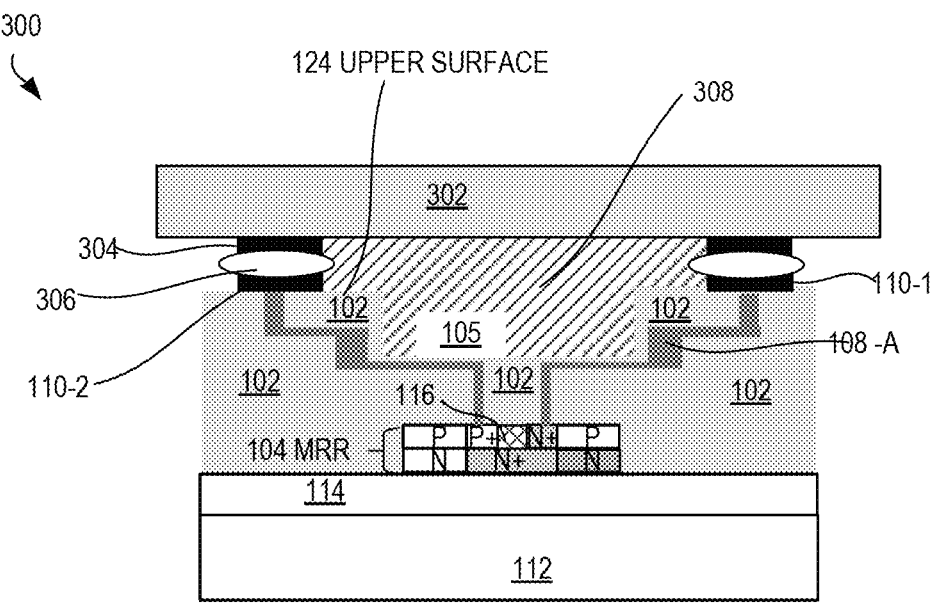
FIG. 3A is an illustration showing the distribution of underfill around the MRR in an open cavity in an OCPIC.
Figure 3B:
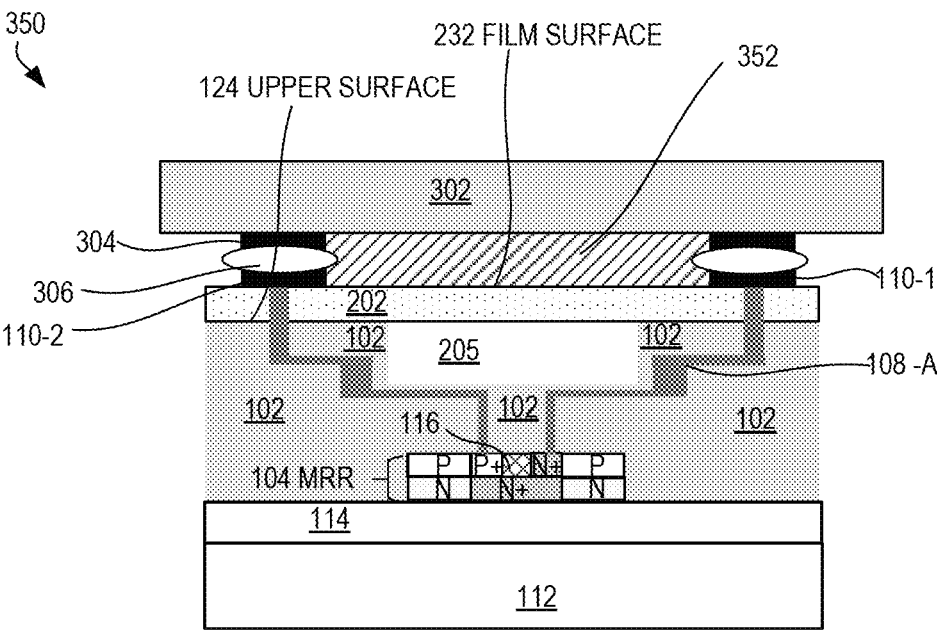
FIG. 3B is an illustration showing the distribution of underfill around the MRR in a covered cavity in an OCPIC, in accordance with various embodiments.

A comparison of FIG. 3A and FIG. 3B illustrate various advantages of the proposed embodiments. In an application 300, such as a multi-chip package (MCP), the OCPIC may be attached to an electronic integrated circuit (EIC) 302. A solder or electrically conductive adhesive 306 may be used to attach a bump pad 110 to a bump pad 304 on the EIC 302. Underfill 308 may be applied. Underfill 308 can flow into the open cavity 105, as shown in FIG. 3. The underfill 308 therefore goes below (in the illustration) the upper surface 124, fills the air cavity 105, essentially removing all or part of the air cavity 105 that was intended as a thermal management strategy. The underfill 308 can, as a result, become located closer to the signal routing 108 and/or the MRR 104 than is desirable. As described, this thermal strategy can cause thermal issues, signal integrity issues, and reliability issues.

In contrast, as depicted in FIG. 3B, the embodiment 350 advantageously assures the integrity of the air cavity intended for thermal management remains present after underfill 352 is added. Embodiments create covered air cavity 205 and protect the covered air cavity 205 with the film 202. Said differently, the underfill 402 does not breach the film 202, therefore, embodiments restrain the underfill 402 to being above (in the illustration) the upper surface 124.

Figure 4A:
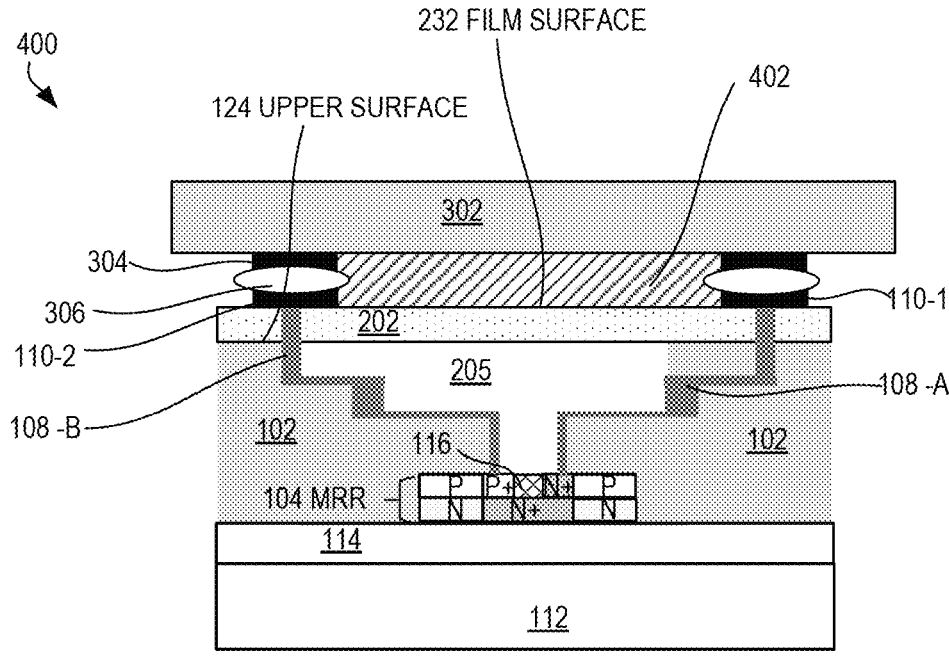
FIG. 4A is another illustration showing the distribution of underfill around the MRR in a covered cavity in an OCPIC, in accordance with various embodiments.

Turning to FIG. 4A, those with skill in the art may appreciate that the open cavity 105 embodiment depicted in FIG. 1B is non-limiting. The open cavity shape and volume are a function of where and how much oxide layer 102 is overlaid on the MRR 104 and routing 108. In the non-limiting example of FIG. 4A, the MRR 104 has a portion of its P+, heater 116, N+ region exposed to the air in the air cavity 205. Additionally, the routing 108-A on the right of the figure is partially covered with the oxide 102 layer, but the routing 108-B on the left side of the figure is exposed to the air in the air cavity 205 on its entire vertical traverse from the conducting contact to the P+ region of the MRR 104. If the film 202 were not present in the embodiment of FIG. 4A, the underfill 402 can potentially touch the routing 108-A, routing 108-B, and/or at least a portion of the MRR 104.

Figure 4B:
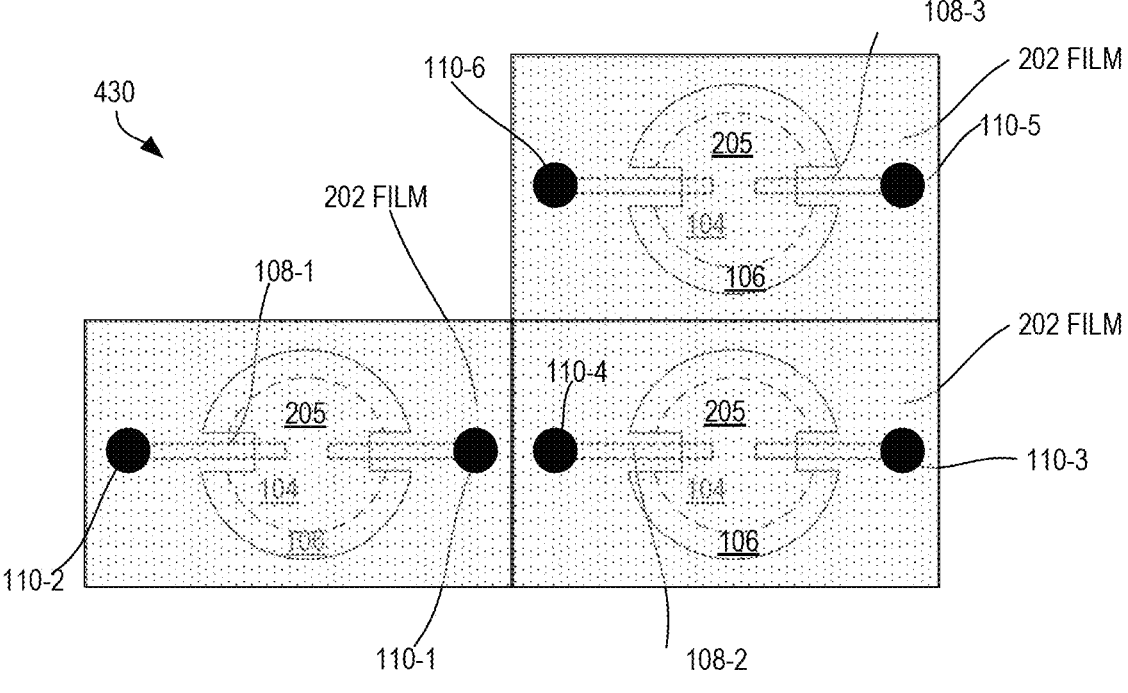
FIG. 4B is an illustration showing the film extending across the upper surface and covering a plurality of MRRs and respective plurality of air cavities.

As mentioned, each OCPIC may include therein a plurality of MRRs. Accordingly, the MRRs are similarly constructed and situated in an open cavity, and the MRR 104 characterized above is a first MRR of the plurality of MRRs. Each MRR of the plurality of MRRs is situated in a respective air cavity, thereby having an associated plurality of air cavities. In other words, each MRR of the plurality of MRRs is located in a respective air cavity open to the upper surface 124. Moreover, the film 202 extends across the upper surface 124 and covers the plurality of MRRs and respective plurality of air cavities. This is depicted in a non-limiting example in FIG. 4B. In FIG. 4B, respective MRRs may be routed separately (108-1, 108-2, 108-3) to respective bump pads (110-1, 110-2, 110-3, 110-4, 110-5 and 110-6).

An example method for fabrication includes growing an oxide 102 layer (also referred to as an oxide cladding) over the MRR 104 and then etching the oxide 102 layer to create the air cavity. Subsequently, the film can be deposited over the cavity.

Embodiments of the herein disclosed closed cavity for an MRR in an OCPIC advantageously accomplish the heat loss reduction while improving assembly, reliability, and signal integrity. Additionally, by continuing to secure air cavities for thermal management of the MRR, embodiments increase the power efficiency of the OCPIC, delivering a lower pico-Joule per bit of WDM channel.

Figure 5:
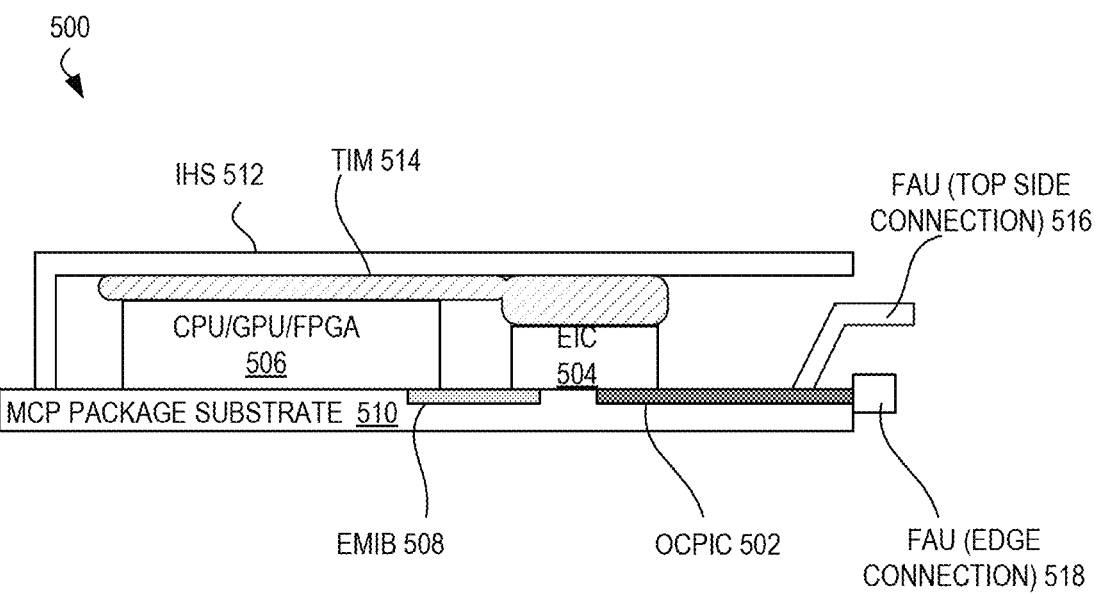
FIG. 5 is a simplified cross-sectional side view of a multi-chip package that includes an OCPIC with a covered cavity, in accordance with various embodiments.

A multi-die integrated circuit component can be referred to as a multi-chip package (MCP) or, alternatively, a multi-chip module (MCM). FIG. 5 is a simplified cross-sectional side view of an exemplary multi-chip package (MCP) 500 that includes an OCPIC 502, in accordance with various embodiments. The MCP 500 may comprise one or more processor units, CPUs, graphics processors, or FPGAs, as represented by electronic integrated circuit (EIC) 504, and integrated circuit 506. In addition, the MCP 500 can comprise additional components, such as embedded DRAM, stacked high bandwidth memory (HBM), shared cache memories, input/output (I/O) controllers, or memory controllers. Any of these additional components can be located on the same integrated circuit die as a processor unit, or on one or more integrated circuit dies separate from the integrated circuit dies comprising the processor units. These separate integrated circuit dies can be referred to as "chiplets."

In some embodiments, the OCPIC 502 chiplet is embedded in a MCP package substrate 510. In other embodiments, the OCPIC 502 chiplet is attached to a MCP package substrate 510. The OCPIC 502 has an MRR (in practice, the OCPIC 502 has a plurality of MRRs, and the OCPIC further has a respective plurality of structures, as defined hereinabove). The OCPIC 502 is adjacent to the EIC 504 that is configured specifically to receive and process data from the OCPIC 502. In practice, interconnections between the dies and/or chiplets of MCP 500 can be provided by the package substrate 510, one or more silicon interposers, one or more silicon bridges 508 embedded in the package substrate 510 (such as Intel® embedded multi-die interconnect bridges (EMIBs)), or combinations thereof. Silicon bridge 508 is shown to operationally couple the integrated circuit 506 with the electronic integrated circuit 504.

A thermal interface material (TIM) 514 may be located over the integrated circuit 506 and the electronic integrated circuit 504. The TIM 514 can be any suitable material, such as a silver thermal compound, thermal grease, phase change materials, indium foils or graphite sheets. An integrated heat spreader (IHS) 512, located on the TIM 514, covers the components of the MCP 500. In practice, the MCP 500, and the OCPIC 502 specifically, may communicate with other components in a device (e.g., device 900, FIG. 9) via a fiber array unit (FAU) connector. In various embodiments, the FAU connector may be a top side connector 516, such as a grating coupler, or an edge connector 518, such as a micro-lens or V-groove.

Figure 6:
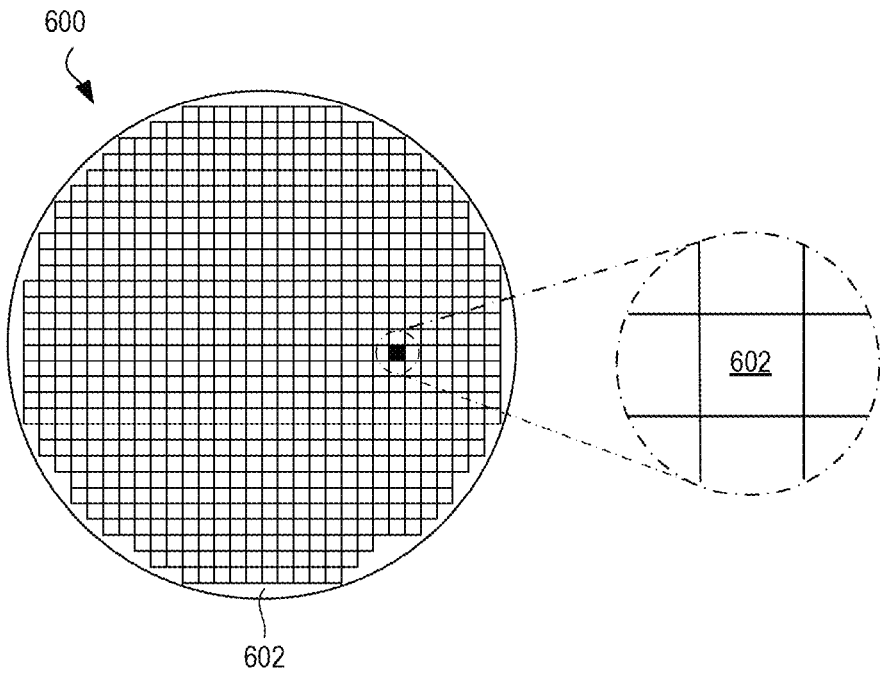
FIG. 6 is a top view of a wafer and dies that may be included in a microelectronic assembly, in accordance with any of the embodiments disclosed herein.

FIG. 6 is a top view of a wafer 600 and dies 602 that may be included in any of the embodiments disclosed herein. The wafer 600 may be composed of semiconductor material and may include one or more dies 602 formed on a surface of the wafer 600. After the fabrication of the integrated circuit components on the wafer 600 is complete, the wafer 600 may undergo a singulation process in which the dies 602 are separated from one another to provide discrete "chips" or destined for a packaged integrated circuit component. The individual dies 602, comprising an integrated circuit component, may include one or more transistors (e.g., some of the transistors 740 of FIG. 7, discussed below), supporting circuitry to route electrical signals to the transistors, passive components (e.g., signal traces, resistors, capacitors, or inductors), and/or any other integrated circuit components. In some embodiments, the wafer 600 or the die 602 may include a memory device (e.g., a random access memory (RAM) device, such as a static RAM (SRAM) device, a magnetic RAM (MRAM) device, a resistive RAM (RRAM) device, a conductive-bridging RAM (CBRAM) device, etc.), a logic device (e.g., an AND, OR, NAND, or NOR gate), or any other suitable circuit element. Additionally, multiple devices may be combined on a single die 602. For example, a memory array formed by multiple memory devices may be formed on a same die 602 as a processor unit (e.g., the processor unit 902 of FIG. 9) or other logic that is configured to store information in the memory devices or execute instructions stored in the memory array. In some embodiments, a die 602 may be attached to a wafer 600 that includes other die, and the wafer 600 is subsequently singulated, this manufacturing procedure is referred to as a die-to-wafer assembly technique.

Figure 7:
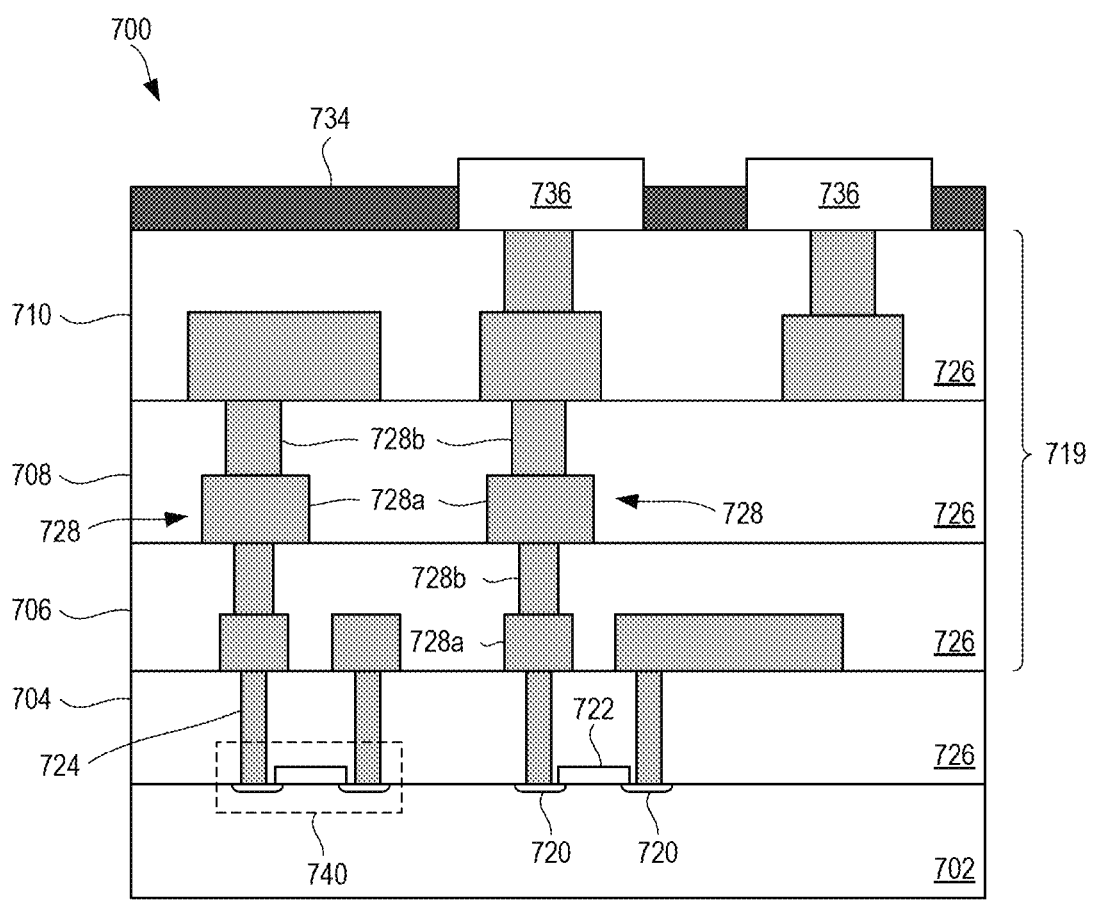
FIG. 7 is a simplified cross-sectional side view showing an implementation of an integrated circuit on a die that may be included in various embodiments, in accordance with any of the embodiments disclosed herein.

FIG. 7 is a cross-sectional side view of an integrated circuit 700 that may be included in any of the embodiments disclosed herein. One or more of the integrated circuits 700 may be included in one or more dies 602 (FIG. 6). The integrated circuit 700 may be formed on a die substrate 702 (e.g., the wafer 600 of FIG. 6) and may be included in a die (e.g., the die 602 of FIG. 6).

The die substrate 702 may be a semiconductor substrate composed of semiconductor material systems including, for example, n-type or p-type materials systems (or a combination of both). The die substrate 702 may include, for example, a crystalline substrate formed using a bulk silicon or a silicon-on-insulator (SOI) substructure. In some embodiments, the die substrate 702 may be formed using alternative materials, which may or may not be combined with silicon, that include, but are not limited to, germanium, indium antimonide, lead telluride, indium arsenide, indium phosphide, gallium arsenide, or gallium antimonide. Further materials classified as group II-VI, III-V, or IV may also be used to form the die substrate 702. Although a few examples of materials from which the die substrate 702 may be formed are described here, any material that may serve as a foundation for an integrated circuit 700 may be used. The die substrate 702 may be part of a singulated die (e.g., the dies 602 of FIG. 6) or a wafer (e.g., the wafer 600 of FIG. 6).

The integrated circuit 700 may include one or more device layers 704 disposed on the die substrate 702. The device layer 704 may include features of one or more transistors 740 (e.g., metal oxide semiconductor field-effect transistors (MOSFETs)) formed on the die substrate 702. The transistors 740 may include, for example, one or more source and/or drain (S/D) regions 720, a gate 722 to control current flow between the S/D regions 720, and one or more S/D contacts 724 to route electrical signals to/from the S/D regions 720.

The gate 722 may be formed of at least two layers, a gate dielectric and a gate electrode. The gate dielectric may include one layer or a stack of layers. The one or more layers may include silicon oxide, silicon dioxide, silicon carbide, and/or a high-k dielectric material. The high-k dielectric material may include elements such as hafnium, silicon, oxygen, titanium, tantalum, lanthanum, aluminum, zirconium, barium, strontium, yttrium, lead, scandium, niobium, and zinc. Examples of high-k materials that may be used in the gate dielectric include, but are not limited to, hafnium oxide, hafnium silicon oxide, lanthanum oxide, lanthanum aluminum oxide, zirconium oxide, zirconium silicon oxide, tantalum oxide, titanium oxide, barium strontium titanium oxide, barium titanium oxide, strontium titanium oxide, yttrium oxide, aluminum oxide, lead scandium tantalum oxide, and lead zinc niobate. In some embodiments, an annealing process may be carried out on the gate dielectric to improve its quality when a high-k material is used.

The gate electrode may be formed on the gate dielectric and may include at least one p-type work function metal or n-type work function metal, depending on whether the transistor 740 is to be a p-type metal oxide semiconductor (PMOS) or an n-type metal oxide semiconductor (NMOS) transistor. In some implementations, the gate electrode may consist of a stack of two or more metal layers, where one or more metal layers are work function metal layers and at least one metal layer is a fill metal layer. Further metal layers may be included for other purposes, such as a barrier layer.

For a PMOS transistor, metals that may be used for the gate electrode include, but are not limited to, ruthenium, palladium, platinum, cobalt, nickel, conductive metal oxides (e.g., ruthenium oxide), and any of the metals discussed below with reference to an NMOS transistor (e.g., for work function tuning). For an NMOS transistor, metals that may be used for the gate electrode include, but are not limited to, hafnium, zirconium, titanium, tantalum, aluminum, alloys of these metals, carbides of these metals (e.g., hafnium carbide, zirconium carbide, titanium carbide, tantalum carbide, and aluminum carbide), and any of the metals discussed above with reference to a PMOS transistor (e.g., for work function tuning).

In some embodiments, when viewed as a cross-section of the transistor 740 along the source-channel-drain direction, the gate electrode may consist of a U-shaped structure that includes a bottom portion substantially parallel to the surface of the die substrate 702 and two sidewall portions that are substantially perpendicular to the top surface of the die substrate 702. In other embodiments, at least one of the metal layers that form the gate electrode may simply be a planar layer that is substantially parallel to the top surface of the die substrate 702 and does not include sidewall portions substantially perpendicular to the top surface of the die substrate 702. In other embodiments, the gate electrode may consist of a combination of U-shaped structures and planar, non-U-shaped structures. For example, the gate electrode may consist of one or more U-shaped metal layers formed atop one or more planar, non-U-shaped layers.

In some embodiments, a pair of sidewall spacers may be formed on opposing sides of the gate stack to bracket the gate stack. The sidewall spacers may be formed from materials such as silicon nitride, silicon oxide, silicon carbide, silicon nitride doped with carbon, and silicon oxynitride. Processes for forming sidewall spacers are well known in the art and generally include deposition and etching process steps. In some embodiments, a plurality of spacer pairs may be used; for instance, two pairs, three pairs, or four pairs of sidewall spacers may be formed on opposing sides of the gate stack.

The S/D regions 720 may be formed within the die substrate 702 adjacent to the gate 722 of individual transistors 740. The S/D regions 720 may be formed using an implantation/diffusion process or an etching/deposition process, for example. In the former process, dopants such as boron, aluminum, antimony, phosphorous, or arsenic may be ion-implanted into the die substrate 702 to form the S/D regions 720. An annealing process that activates the dopants and causes them to diffuse farther into the die substrate 702 may follow the ion-implantation process. In the latter process, the die substrate 702 may first be etched to form recesses at the locations of the S/D regions 720. An epitaxial deposition process may then be carried out to fill the recesses with material that is used to fabricate the S/D regions 720. In some implementations, the S/D regions 720 may be fabricated using a silicon alloy such as silicon germanium or silicon carbide. In some embodiments, the epitaxially deposited silicon alloy may be doped in situ with dopants such as boron, arsenic, or phosphorous. In some embodiments, the S/D regions 720 may be formed using one or more alternate semiconductor materials such as germanium or a group III-V material or alloy. In further embodiments, one or more layers of metal and/or metal alloys may be used to form the S/D regions 720.

Electrical signals, such as power and/or input/output (I/O) signals, may be routed to and/or from the devices (e.g., transistors 740) of the device layer 704 through one or more interconnect layers disposed on the device layer 704 (illustrated in FIG. 7 as interconnect layers 706-710). For example, electrically conductive features of the device layer 704 (e.g., the gate 722 and the S/D contacts 724) may be electrically coupled with the interconnect structures 728 of the interconnect layers 706-710. The one or more interconnect layers 706-710 may form a metallization stack (also referred to as an "ILD stack") 719 of the integrated circuit 700.

The interconnect structures 728 may be arranged within the interconnect layers 706-710 to route electrical signals according to a wide variety of designs; in particular, the arrangement is not limited to the particular configuration of interconnect structures 728 depicted in FIG. 7. Although a particular number of interconnect layers 706-710 is depicted in FIG. 7, embodiments of the present disclosure include integrated circuits having more or fewer interconnect layers than depicted.

In some embodiments, the interconnect structures 728 may include lines 728a and/or vias 728b filled with an electrically conductive material such as a metal. The lines 728a may be arranged to route electrical signals in a direction of a plane that is substantially parallel with a surface of the die substrate 702 upon which the device layer 704 is formed. For example, the lines 728a may route electrical signals in a direction in and out of the page and/or in a direction across the page. The vias 728b may be arranged to route electrical signals in a direction of a plane that is substantially perpendicular to the surface of the die substrate 702 upon which the device layer 704 is formed. In some embodiments, the vias 728b may electrically couple lines 728a of different interconnect layers 706-710 together.

The interconnect layers 706-710 may include a dielectric material 726 disposed between the interconnect structures 728, as shown in FIG. 7. In some embodiments, dielectric material 726 disposed between the interconnect structures 728 in different ones of the interconnect layers 706-710 may have different compositions; in other embodiments, the composition of the dielectric material 726 between different interconnect layers 706-710 may be the same. The device layer 704 may include a dielectric material 726 disposed between the transistors 740 and a bottom layer of the metallization stack as well. The dielectric material 726 included in the device layer 704 may have a different composition than the dielectric material 726 included in the interconnect layers 706-710; in other embodiments, the composition of the dielectric material 726 in the device layer 704 may be the same as a dielectric material 726 included in any one of the interconnect layers 706-710.

A first interconnect layer 706 (referred to as Metal 1 or "M1") may be formed directly on the device layer 704. In some embodiments, the first interconnect layer 706 may include lines 728a and/or vias 728b, as shown. The lines 728a of the first interconnect layer 706 may be coupled with contacts (e.g., the S/D contacts 724) of the device layer 704. The vias 728b of the first interconnect layer 706 may be coupled with the lines 728a of a second interconnect layer 708.

The second interconnect layer 708 (referred to as Metal 2 or "M2") may be formed directly on the first interconnect layer 706. In some embodiments, the second interconnect layer 708 may include via 728b to couple the lines 728 of the second interconnect layer 708 with the lines 728a of a third interconnect layer 710. Although the lines 728a and the vias 728b are structurally delineated with a line within individual interconnect layers for the sake of clarity, the lines 728a and the vias 728b may be structurally and/or materially contiguous (e.g., simultaneously filled during a dual-damascene process) in some embodiments.

The third interconnect layer 710 (referred to as Metal 3 or "M3") (and additional interconnect layers, as desired) may be formed in succession on the second interconnect layer 708 according to similar techniques and configurations described in connection with the second interconnect layer 708 or the first interconnect layer 706. In some embodiments, the interconnect layers that are "higher up" in the metallization stack 719 in the integrated circuit 700 (i.e., farther away from the device layer 704) may be thicker that the interconnect layers that are lower in the metallization stack 719, with lines 728a and vias 728b in the higher interconnect layers being thicker than those in the lower interconnect layers.

The integrated circuit 700 may include a solder resist material 734 (e.g., polyimide or similar material) and one or more conductive contacts 736 formed on the interconnect layers 706-710. In FIG. 7, the conductive contacts 736 are illustrated as taking the form of bond pads. The conductive contacts 736 may be electrically coupled with the interconnect structures 728 and configured to route the electrical signals of the transistor(s) 740 to external devices. For example, solder bonds may be formed on the one or more conductive contacts 736 to mechanically and/or electrically couple an integrated circuit die including the integrated circuit 700 with another component (e.g., a printed circuit board). The integrated circuit 700 may include additional or alternate structures to route the electrical signals from the interconnect layers 706-710; for example, the conductive contacts 736 may include other analogous features (e.g., posts) that route the electrical signals to external components.

In some embodiments in which the integrated circuit 700 is a double-sided die, the integrated circuit 700 may include another metallization stack (not shown) on the opposite side of the device layer(s) 704. This metallization stack may include multiple interconnect layers as discussed above with reference to the interconnect layers 706-710, to provide conductive pathways (e.g., including conductive lines and vias) between the device layer(s) 704 and additional conductive contacts (not shown) on the opposite side of the integrated circuit 700 from the conductive contacts 736.

In other embodiments in which the integrated circuit 700 is a double-sided die, the integrated circuit 700 may include one or more through silicon vias (TSVs) through the die substrate 702; these TSVs may make contact with the device layer(s) 704, and may provide conductive pathways between the device layer(s) 704 and additional conductive contacts (not shown) on the opposite side of the integrated circuit 700 from the conductive contacts 736. In some embodiments, TSVs extending through the substrate can be used for routing power and ground signals from conductive contacts on the opposite side of the integrated circuit 700 from the conductive contacts 736 to the transistors 740 and any other components integrated into the die 700, and the metallization stack 719 can be used to route I/O signals from the conductive contacts 736 to transistors 740 and any other components integrated into the die 700.

Multiple integrated circuits 700 may be stacked with one or more TSVs in the individual stacked devices providing connection between one of the devices to any of the other devices in the stack. For example, one or more high-bandwidth memory (HBM) integrated circuit dies can be stacked on top of a base integrated circuit die and TSVs in the HBM dies can provide connection between the individual HBM and the base integrated circuit die. Conductive contacts can provide additional connections between adjacent integrated circuit dies in the stack. In some embodiments, the conductive contacts can be fine-pitch solder bumps (microbumps).

Figure 8:
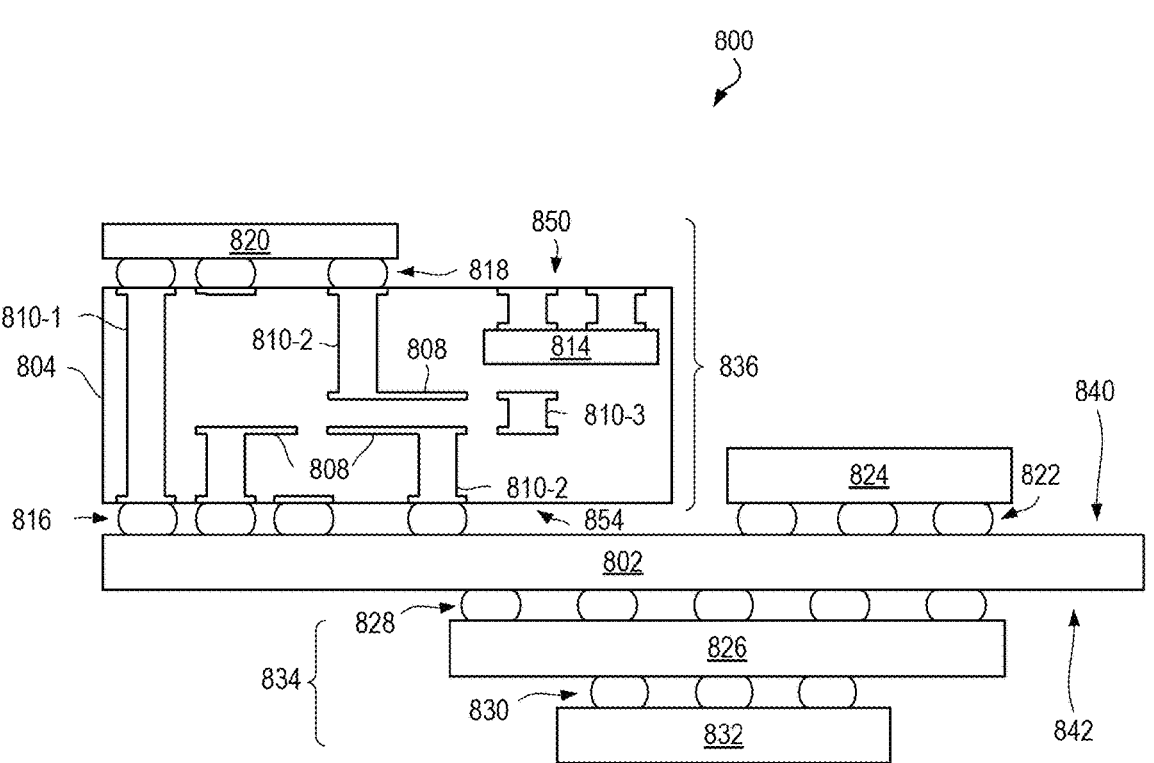
FIG. 8 is a cross-sectional side view of a microelectronic assembly that may include any of the embodiments disclosed herein.

FIG. 8 is a cross-sectional side view of a microelectronic assembly 800 that may include any of the embodiments disclosed herein. The microelectronic assembly 800 includes multiple integrated circuit components disposed on a circuit board 802 (which may be a motherboard, system board, mainboard, etc.). The microelectronic assembly 800 may include components disposed on a first face 840 of the circuit board 802 and an opposing second face 842 of the circuit board 802; generally, components may be disposed on one or both faces 840 and 842.

In some embodiments, the circuit board 802 may be a printed circuit board (PCB) including multiple metal (or interconnect) layers separated from one another by layers of dielectric material and interconnected by electrically conductive vias. The individual metal layers comprise conductive traces. Any one or more of the metal layers may be formed in a desired circuit pattern to route electrical signals (optionally in conjunction with other metal layers) between the components coupled to the circuit board 802. In other embodiments, the circuit board 802 may be a non-PCB substrate. The microelectronic assembly 800 illustrated in FIG. 8 includes a package-on-interposer structure 836 coupled to the first face 840 of the circuit board 802 by coupling components 816. The coupling components 816 may electrically and mechanically couple the package-on-interposer structure 836 to the circuit board 802, and may include solder balls (as shown in FIG. 8), pins (e.g., as part of a pin grid array (PGA), contacts (e.g., as part of a land grid array (LGA)), male and female portions of a socket, an adhesive, an underfill material, and/or any other suitable electrical and/or mechanical coupling structure.

The package-on-interposer structure 836 may include an integrated circuit component 820 coupled to an interposer 804 by coupling components 818. The coupling components 818 may take any suitable form for the application, such as the forms discussed above with reference to the coupling components 816. Although a single integrated circuit component 820 is shown in FIG. 8, multiple integrated circuit components may be coupled to the interposer 804; indeed, additional interposers may be coupled to the interposer 804. The interposer 804 may provide an intervening substrate used to bridge the circuit board 802 and the integrated circuit component 820.

The integrated circuit component 820 may be a packaged or unpackaged integrated circuit component that includes one or more integrated circuit dies (e.g., the die 602 of FIG. 6, the integrated circuit 700 of FIG. 7) and/or one or more other suitable components.

The unpackaged integrated circuit component 820 comprises solder bumps attached to contacts on the die. The solder bumps allow the die to be directly attached to the interposer 804. In embodiments where the integrated circuit component 820 comprises multiple integrated circuit dies, the dies can be of the same type (a homogeneous multi-die integrated circuit component) or of two or more different types (a heterogeneous multi-die integrated circuit component). In addition to comprising one or more processor units, the integrated circuit component 820 can comprise additional components, such as embedded DRAM, stacked high bandwidth memory (HBM), shared cache memories, input/output (I/O) controllers, or memory controllers. Any of these additional components can be located on the same integrated circuit die as a processor unit, or on one or more integrated circuit dies separate from the integrated circuit dies comprising the processor units. These separate integrated circuit dies can be referred to as "chiplets". In embodiments where an integrated circuit component comprises multiple integrated circuit dies, interconnections between dies can be provided by the package substrate, one or more silicon interposers, one or more silicon bridges embedded in the package substrate (such as Intel® embedded multi-die interconnect bridges (EMIBs)), or combinations thereof. A packaged multi-die integrated circuit component can be referred to as a multi-chip package (MCP) or multi-chip module (MCM).

Generally, the interposer 804 may spread connections to a wider pitch or reroute a connection to a different connection. For example, the interposer 804 may couple the integrated circuit component 820 to a set of ball grid array (BGA) conductive contacts of the coupling components 816 for coupling to the circuit board 802. In the embodiment illustrated in FIG. 8, the integrated circuit component 820 and the circuit board 802 are attached to opposing sides of the interposer 804; in other embodiments, the integrated circuit component 820 and the circuit board 802 may be attached to a same side of the interposer 804. In some embodiments, three or more components may be interconnected by way of the interposer 804.

In some embodiments, the interposer 804 may be formed as a PCB, including multiple metal layers separated from one another by layers of dielectric material and interconnected by electrically conductive vias. In some embodiments, the interposer 804 may be formed of an epoxy resin, a fiberglass-reinforced epoxy resin, an epoxy resin with inorganic fillers, a ceramic material, or a polymer material such as polyimide. In some embodiments, the interposer 804 may be formed of alternate rigid or flexible materials that may include the same materials described above for use in a semiconductor substrate, such as silicon, germanium, and other group III-V and group IV materials. The interposer 804 may include metal interconnects 808 and vias 810, including but not limited to through hole vias 810-1 (that extend from a first face 850 of the interposer 804 to a second face 854 of the interposer 804), blind vias 810-2 (that extend from the first or second faces 850 or 854 of the interposer 804 to an internal metal layer), and buried vias 810-3 (that connect internal metal layers).

In some embodiments, the interposer 804 can comprise a silicon interposer. Through silicon vias (TSV) extending through the silicon interposer can connect connections on a first face of a silicon interposer to an opposing second face of the silicon interposer. In some embodiments, an interposer 804 comprising a silicon interposer can further comprise one or more routing layers to route connections on a first face of the interposer 804 to an opposing second face of the interposer 804.

The interposer 804 may further include embedded devices 814, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio frequency devices, power amplifiers, power management devices, antennas, arrays, sensors, and microelectromechanical systems (MEMS) devices may also be formed on the interposer 804. The package-on-interposer structure 836 may take the form of any of the package-on-interposer structures known in the art. In embodiments where the interposer is a non-printed circuit board The integrated circuit assembly 800 may include an integrated circuit component 824 coupled to the first face 840 of the circuit board 802 by coupling components 822. The coupling components 822 may take the form of any of the embodiments discussed above with reference to the coupling components 816, and the integrated circuit component 824 may take the form of any of the embodiments discussed above with reference to the integrated circuit component 820.

The integrated circuit assembly 800 illustrated in FIG. 8 includes a package-on-package structure 834 coupled to the second face 842 of the circuit board 802 by coupling components 828. The package-on-package structure 834 may include an integrated circuit component 826 and an integrated circuit component 832 coupled together by coupling components 830 such that the integrated circuit component 826 is disposed between the circuit board 802 and the integrated circuit component 832. The coupling components 828 and 830 may take the form of any of the embodiments of the coupling components 816 discussed above, and the integrated circuit components 826 and 832 may take the form of any of the embodiments of the integrated circuit component 820 discussed above. The package-on-package structure 834 may be configured in accordance with any of the package-on-package structures known in the art.

Figure 9:
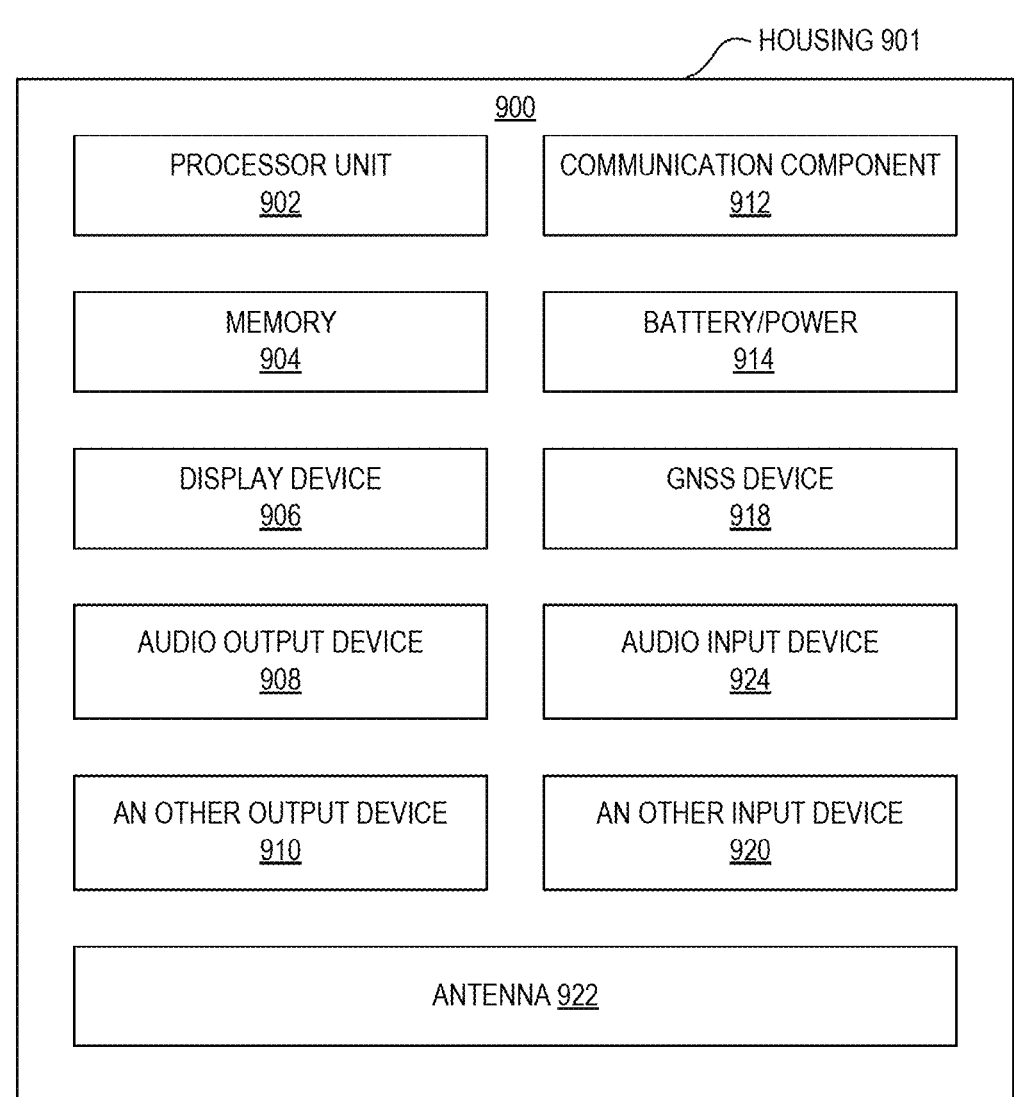
FIG. 9 is a block diagram of an example electrical device that may include any of the embodiments disclosed herein.

FIG. 9 is a block diagram of an example electrical device 900 that may include one or more of the embodiments disclosed herein. For example, any suitable electrical device 900 may include one or more of the microelectronic assemblies 800, integrated circuit components 820, integrated circuits 700, integrated circuit dies 602, or MRR 104 structures disclosed herein. Although the electrical device 900 is depicted as including a number of components in FIG. 9, any one or more of these components may be omitted or duplicated, as suitable for the application. In some embodiments, some or all of the components included in the electrical device 900 may be attached to one or more motherboards mainboards, printed circuit boards, or system boards. In some embodiments, one or more of these components are fabricated onto a single system-on-a-chip (SoC) die.

Additionally, in various embodiments, the electrical device 900 may not include one or more of the components illustrated in FIG. 9, but the electrical device 900 may include interface circuitry for coupling to the one or more components. For example, the electrical device 900 may not include a display device 906, but may include display device interface circuitry (e.g., a connector and driver circuitry) to which a display device 906 may be coupled. In another set of examples, the electrical device 900 may not include an audio input device 924 or an audio output device 908, but may include audio input or output device interface circuitry (e.g., connectors and supporting circuitry) to which an audio input device 924 or audio output device 908 may be coupled.

The electrical device 900 may include one or more processor units 902 (e.g., one or more processor units). As used herein, the terms "processor unit", "processing unit" or "processor" may refer to any device or portion of a device that processes electronic data from registers and/or memory to transform that electronic data into other electronic data that may be stored in registers and/or memory. The processor unit 902 may include one or more digital signal processors (DSPs), application-specific integrated circuits (ASICs), central processing units (CPUs), graphics processing units (GPUs), general-purpose GPUs (GPGPUs), accelerated processing units (APUs), field-programmable gate arrays (FPGAs), neural network processing units (NPUs), data processor units (DPUs), accelerators (e.g., graphics accelerator, compression accelerator, artificial intelligence accelerator), controller crypto processors (specialized processors that execute cryptographic algorithms within hardware), server processors, controllers, or any other suitable type of processor units. As such, the processor unit can be referred to as an XPU (or xPU).

The electrical device 900 may include a memory 904, which may itself include one or more memory devices such as volatile memory (e.g., dynamic random access memory (DRAM), static random-access memory (SRAM)), nonvolatile memory (e.g., read-only memory (ROM), flash memory, chalcogenide-based phase-change non-voltage memories), solid state memory, and/or a hard drive. In some embodiments, the memory 904 may include memory that is located on the same integrated circuit die as the processor unit 902. This memory may be used as cache memory (e.g., Level 1 (L1), Level 2 (L2), Level 3 (L3), Level 4 (L4), Last Level Cache (LLC)) and may include embedded dynamic random-access memory (eDRAM) or spin transfer torque magnetic random-access memory (STT-MRAM).

In some embodiments, the electrical device 900 can comprise one or more processor units 902 that are heterogeneous or asymmetric to another processor unit 902 in the electrical device 900. There can be a variety of differences between the processing units 902 in a system in terms of a spectrum of metrics of merit including architectural, micro-architectural, thermal, power consumption characteristics, and the like. These differences can effectively manifest themselves as asymmetry and heterogeneity among the processor units 902 in the electrical device 900.

In some embodiments, the electrical device 900 may include a communication component 912 (e.g., one or more communication components). For example, the communication component 912 can manage wireless communications for the transfer of data to and from the electrical device 900. The term "wireless" and its derivatives may be used to describe circuits, devices, systems, methods, techniques, communications channels, etc., that may communicate data through the use of modulated electromagnetic radiation through a nonsolid medium. The term "wireless" does not imply that the associated devices do not contain any wires, although in some embodiments they might not.

The communication component 912 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra-mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication component 912 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication component 912 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication component 912 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication component 912 may operate in accordance with other wireless protocols in other embodiments. The electrical device 900 may include an antenna 922 to facilitate wireless communications and/or to receive other wireless communications (such as AM or FM radio transmissions).

In some embodiments, the communication component 912 may manage wired communications, such as electrical, optical, or any other suitable communication protocols (e.g., IEEE 802.3 Ethernet standards). As noted above, the communication component 912 may include multiple communication components. For instance, a first communication component 912 may be dedicated to shorter-range wireless communications such as Wi-Fi or Bluetooth, and a second communication component 912 may be dedicated to longer-range wireless communications such as global positioning system (GPS), EDGE, GPRS, CDMA, WiMAX, LTE, EV-DO, or others. In some embodiments, a first communication component 912 may be dedicated to wireless communications, and a second communication component 912 may be dedicated to wired communications.

The electrical device 900 may include battery/power circuitry 914. The battery/power circuitry 914 may include one or more energy storage devices (e.g., batteries or capacitors) and/or circuitry for coupling components of the electrical device 900 to an energy source separate from the electrical device 900 (e.g., AC line power).

The electrical device 900 may include a display device 906 (or corresponding interface circuitry, as discussed above). The display device 906 may include one or more embedded or wired or wirelessly connected external visual indicators, such as a heads-up display, a computer monitor, a projector, a touchscreen display, a liquid crystal display (LCD), a light-emitting diode display, or a flat panel display.

The electrical device 900 may include an audio output device 908 (or corresponding interface circuitry, as discussed above). The audio output device 908 may include any embedded or wired or wirelessly connected external device that generates an audible indicator, such speakers, headsets, or earbuds.

The electrical device 900 may include an audio input device 924 (or corresponding interface circuitry, as discussed above). The audio input device 924 may include any embedded or wired or wirelessly connected device that generates a signal representative of a sound, such as microphones, microphone arrays, or digital instruments (e.g., instruments having a musical instrument digital interface (MIDI) output). The electrical device 900 may include a Global Navigation Satellite System (GNSS) device 918 (or corresponding interface circuitry, as discussed above), such as a Global Positioning System (GPS) device. The GNSS device 918 may be in communication with a satellite-based system and may determine a geolocation of the electrical device 900 based on information received from one or more GNSS satellites, as known in the art.

The electrical device 900 may include another output device 910 (or corresponding interface circuitry, as discussed above). Examples of the other output device 910 may include an audio codec, a video codec, a printer, a wired or wireless transmitter for providing information to other devices, or an additional storage device.

The electrical device 900 may include another input device 920 (or corresponding interface circuitry, as discussed above). Examples of the other input device 920 may include an accelerometer, a gyroscope, a compass, an image capture device (e.g., monoscopic or stereoscopic camera), a trackball, a trackpad, a touchpad, a keyboard, a cursor control device such as a mouse, a stylus, a touchscreen, proximity sensor, microphone, a bar code reader, a Quick Response (QR) code reader, electrocardiogram (ECG) sensor, PPG (photoplethysmogram) sensor, galvanic skin response sensor, any other sensor, or a radio frequency identification (RFID) reader.

The electrical device 900 may have any desired form factor, such as a hand-held or mobile electrical device (e.g., a cell phone, a smart phone, a mobile internet device, a music player, a tablet computer, a laptop computer, a 2-in-1 convertible computer, a portable all-in-one computer, a netbook computer, an ultrabook computer, a personal digital assistant (PDA), an ultra-mobile personal computer, a portable gaming console, etc.), a desktop electrical device, a server, a rack-level computing solution (e.g., blade, tray or sled computing systems), a workstation or other networked computing component, a printer, a scanner, a monitor, a set-top box, an entertainment control unit, a stationary gaming console, smart television, a vehicle control unit, a digital camera, a digital video recorder, a wearable electrical device or an embedded computing system (e.g., computing systems that are part of a vehicle, smart home appliance, consumer electronics product or equipment, manufacturing equipment). In some embodiments, the electrical device 900 may be any other electronic device that processes data. In some embodiments, the electrical device 900 may comprise multiple discrete physical components. Given the range of devices that the electrical device 900 can be manifested as in various embodiments, in some embodiments, the electrical device 900 can be referred to as a computing device or a computing system.

Thus, embodiments of a structure for an open-cavity photonic integrated circuit (OCPIC) having a micro-ring resonator (MRR) have been provided. The provided embodiments advantageously enhance power efficiency of the MRR and the OCPIC. Embodiments enable the use of finer pitch architectures and high-density input/output (I/O) designs without impacting thermal efficiency.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. Various changes can be made in the function and arrangement of elements without departing from the scope of the disclosure as set forth in the appended claims and the legal equivalents thereof.

As used herein, phrases such as "an embodiment," "various embodiments," "some embodiments," and the like, indicate that some embodiments may have some, all, or none of the features described for other embodiments. "First," "second," "third," and the like describe a common object and indicate different instances of like objects being referred to; unless specifically stated, they do not imply a given sequence, either temporally or spatially, in ranking, or any other manner. In accordance with patent application parlance, "connected" indicates elements that are in direct physical or electrical contact with each other and "coupled" indicates elements that co-operate or interact with each other, coupled elements may or may not be in direct physical or electrical contact. Furthermore, the terms "comprising," "including," "having," and the like, are utilized synonymously to denote non-exclusive inclusions.

As used in this application and the claims, a list of items joined by the term "at least one of" or the term "one or more of" can mean any combination of the listed terms. For example, the phrase "at least one of A, B or C" can mean A; B; C; A and B; A and C; B and C; or A, B, and C. Likewise, the phrase "one or more of A, B and C" can mean A; B; C; A and B; A and C; B and C; or A, B, and C.

As used in this application and the claims, the phrase "individual of" or "respective of" following by a list of items recited or stated as having a trait, feature, etc. means that all of the items in the list possess the stated or recited trait, feature, etc. For example, the phrase "individual of A, B, or C, comprise a sidewall" or "respective of A, B, or C, comprise a sidewall" means that A comprises a sidewall, B comprises sidewall, and C comprises a sidewall.

Theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Example 1 includes: a silicon waveguide structure located on a substrate; an oxide layer overlaid on the silicon waveguide structure and substrate; an air cavity in the oxide layer, open to an upper surface of the oxide layer; and a film adjacent to the upper surface and enclosing the air cavity at the upper surface.

Example 2 includes the subject matter of claim 1, wherein the silicon waveguide structure includes a heater.

Example 3 includes the subject matter of any one of Examples 1-2, wherein the air cavity is located over the silicon waveguide structure.

Example 4 includes the subject matter of any one of Examples 1-3, wherein the air cavity embodies an air trench that encircles at least a portion of the silicon waveguide structure.

Example 5 includes the subject matter of any one of Examples 1-4, further comprising a buried oxide layer located between the oxide layer and the substrate, and wherein the air trench extends into the buried oxide layer.

Example 6 includes the subject matter of any one of Examples 1-4, further comprising a buried oxide layer between the silicon waveguide structure and the substrate, and the air trench extends into the buried oxide layer and into the substrate under the silicon waveguide structure.

Example 7 includes the subject matter of any one of Examples 1-6, wherein the film is an organic film.

Example 8 includes the subject matter of any one of Examples 1-7, further comprising: a first signal route from a first region in the silicon waveguide structure through the film to a first bump pad on the upper surface; and a second signal route from a second region in the silicon waveguide structure through the film to a second bump pad on the upper surface.

Example 9 is a multi-chip package (MCP), comprising: a substrate; an open-cavity photonic integrated circuit (OCPIC) attached to the substrate, the OCPIC including: a micro-ring resonator (MRR) located between a silicon layer and an oxide layer; an air cavity in the oxide layer, open to an upper surface of the oxide layer; and a film adjacent to the upper surface and enclosing the air cavity at the upper surface.

Example 10 includes the subject matter of Example 9, wherein the MRR is one of a plurality of MRRs.

Example 11 includes the subject matter of any one of Examples 9-10 wherein the air cavity is located over the MRR.

Example 12 includes the subject matter of any one of Examples 9-11, wherein the air cavity embodies an air trench that encircles at least a portion of the MRR.

Example 13 includes the subject matter of any one of Examples 9-12, wherein the air trench extends into a buried oxide layer.

Example 14 includes the subject matter of any one of Examples 9-13, wherein the OCPIC further comprises a buried oxide layer between the MRR and the substrate, and wherein the air trench extends into the buried oxide layer and into the substrate under the MRR.

Example 15 includes the subject matter of any one of Examples 9-14, wherein the film is an organic film.

Example 16 includes the subject matter of any one of Examples 9-15, further comprising: a first signal route from a first region in the MRR to a first bump pad on the upper surface; and a second signal route from a second region in the MRR to a second bump pad on the upper surface.

Example 17 includes the subject matter of any one of Examples 9-16, wherein the MRR is a first MRR of a plurality of MRRs in the OCPIC, the plurality of MRRs having a respective plurality of air cavities.

Example 18 includes the subject matter of any one of Examples 9-16, wherein the MRR is a first MRR of a plurality of MRRs in the OCPIC, and the film extends across a respective plurality of air cavities.

Example 19 is a device, comprising: a printed circuit board; and a multi-chip package (MCP) attached to the printed circuit board, the MCP comprising: a MCP substrate; and an open cavity photonic integrated circuit (OCPIC) embedded in the MCP substrate, the OCPIC including: a micro-ring resonator (MRR) on a silicon layer; an oxide layer overlaid on the MRR; an air cavity in the oxide layer, open to an upper surface; and a film located adjacent to the upper surface and enclosing the air cavity.

Example 20 includes the subject matter of any one of Example 19, wherein the air cavity includes an air trench that encircles at least a portion of the MRR.

Example 21 includes the subject matter of any one of Examples 19-20 further comprising an electronic integrated circuit (EIC) attached to the OCPIC.

Example 22 includes the subject matter of any one of Examples 19-21, further comprising underfill between the EIC and the film.

Example 23 includes the subject matter of any one of Examples 19-22, wherein the air trench extends into a buried oxide layer.

Example 24 includes the subject matter of any one of Examples 19-23, wherein the MCP further comprises a buried oxide layer located between the MRR and the silicon layer, and the air trench extends into the buried oxide layer and into the silicon layer under the MRR.

Example 25 includes the subject matter of any one of Examples 19-24, wherein the film is an organic film.

What is claimed is:

1. A structure, comprising:
   a silicon waveguide structure located on a substrate;
   an oxide layer overlaid on the silicon waveguide structure and substrate;
   an air cavity in the oxide layer, open to an upper surface of the oxide layer, wherein the air cavity is located over the silicon waveguide structure; and
   a film adjacent to the upper surface and enclosing the air cavity at the upper surface.

2. The structure of claim 1, wherein the silicon waveguide structure includes a heater.

3. The structure of claim 1, wherein the air cavity embodies an air trench that encircles at least a portion of the silicon waveguide structure.

4. The structure of claim 1, further comprising a buried oxide layer located between the oxide layer and the substrate, and wherein the air trench extends into the buried oxide layer.

5. The structure of claim 1, further comprising a buried oxide layer between the silicon waveguide structure and the substrate, and the air trench extends into the buried oxide layer and into the substrate under the silicon waveguide structure.

6. The structure of any one of the preceding claims, wherein the film is an organic film.

7. The structure of claim 1, further comprising:
   a first signal route from a first region in the silicon waveguide structure through the film to a first bump pad on the upper surface; and
   a second signal route from a second region in the silicon waveguide structure through the film to a second bump pad on the upper surface.

8. A multi-chip package (MCP), comprising:
   a substrate;
   an open-cavity photonic integrated circuit (OCPIC) attached to the substrate, the OCPIC including:
   a micro-ring resonator (MRR) located between a silicon layer and an oxide layer;
   an air cavity in the oxide layer, open to an upper surface of the oxide layer; and
   a film adjacent to the upper surface and enclosing the air cavity at the upper surface.

9. The MCP of claim 8, wherein the MRR is one of a plurality of MRRs.

10. The MCP of claim 8 wherein the air cavity is located over the MRR.

11. The MCP of claim 8 wherein the air cavity embodies an air trench that encircles at least a portion of the MRR.

12. The MCP of claim 8, wherein the air trench extends into a buried oxide layer.

13. The MCP of claim 8, wherein the OCPIC further comprises a buried oxide layer between the MRR and the substrate, and wherein the air trench extends into the buried oxide layer and into the substrate under the MRR.

14. The MCP of claim 8, wherein the film is an organic film.

15. The MCP of claim 8, further comprising:
    a first signal route from a first region in the MRR to a first bump pad on the upper surface; and
    a second signal route from a second region in the MRR to a second bump pad on the upper surface.

16. The MCP of claim 8, wherein the MRR is a first MRR of a plurality of MRRs in the OCPIC, the plurality of MRRs having a respective plurality of air cavities.

17. The MCP of claim 8, wherein the MRR is a first MRR of a plurality of MRRs in the OCPIC, and the film extends across a respective plurality of air cavities.

18. A device, comprising:
    a printed circuit board; and
    a multi-chip package (MCP) attached to the printed circuit board, the MCP comprising:
    an MCP substrate; and
    an open cavity photonic integrated circuit (OCPIC) embedded in the MCP substrate, the OCPIC including:
    a micro-ring resonator (MRR) on a silicon layer;
    an oxide layer overlaid on the MRR;
    an air cavity in the oxide layer, open to an upper surface; and
    a film located adjacent to the upper surface and enclosing the air cavity.

19. The device of claim 18, wherein the air cavity includes an air trench that encircles at least a portion of the MRR.

20. The device of claim 18 further comprising an electronic integrated circuit (EIC) attached to the OCPIC.

21. The device of claim 18, further comprising underfill between the EIC and the film.

22. The device of claim 18, wherein the air trench extends into a buried oxide layer.

23. The device of claim 18, wherein the MCP further comprises a buried oxide layer located between the MRR and the silicon layer, and the air trench extends into the buried oxide layer and into the silicon layer under the MRR.

24. The device of claim 18, wherein the film is an organic film.

\* \* \* \* \*